United States Patent [19]
Ohlschlager et al.

[11] 3,776,738
[45] Dec. 4, 1973

[54] SILVER HALIDE EMULSIONS SENSITIZED WITH A COMBINATION OF OXAZOLINE OR DIHYDROOXAZINE CYANINE DYES AND MERCAPTO OR SELENOL COMPOUNDS

[75] Inventors: Hans Ohlschlager, Hahnenweg; Oskar Riester, Goetheplatz, both of Germany

[73] Assignee: Agfa-Gevaert Aktiengesellschaft, Leverkusen, Germany

[22] Filed: Feb. 8, 1972

[21] Appl. No.: 224,596

[52] U.S. Cl................ 96/126, 96/107, 96/109, 96/131, 96/135, 96/138
[51] Int. Cl............................................. G03c 1/14
[58] Field of Search................. 96/126, 109, 135

[56] References Cited
UNITED STATES PATENTS

| 2,546,642 | 3/1951 | Koerber et al. | 96/129 |
|---|---|---|---|
| 3,266,897 | 8/1966 | Kennard et al. | 96/109 |
| 3,305,362 | 2/1967 | Riester et al. | 96/109 |
| 3,457,078 | 7/1969 | Riester | 96/126 |

Primary Examiner—J. Travis Brown
Attorney—Walter C. Kehm et al.

[57] ABSTRACT

Light sensitized photographic materials containing trimethine cyanine dyes of the oxazoline and dehydrooxazine series and hypersensitizing additives of mercapto or selenol compounds which contain acid groups.

6 Claims, No Drawings

SILVER HALIDE EMULSIONS SENSITIZED WITH A COMBINATION OF OXAZOLINE OR DIHYDROOXAZINE CYANINE DYES AND MERCAPTO OR SELENOL COMPOUNDS

This invention relates to a photographic material having at least one silver halide emulsion layer which contains cyanine dyes derived from oxazoline or dihydrooxazine as spectral sensitizers and certain mercapto compounds as hypersensitizing additives.

Oxazoline and dihydrooxazine dyes have so far remained without any immediate practical importance as spectral sensitizers. Although oxazoline dyes have been mentioned in several Patent Specifications for this purpose, their effect is so slight that they could not complete satisfactorily with cyanines the known spectral sensitizers which are used in so many different modifications.

It is an object of the invention to find sensitizing dyes for photographic silver halide emulsions which have a very high intensity of sensitization and little tendency to produce fogging and which can easily be removed by washing.

It has now been found that photographic silver halide emulsion layers can be sensitized very satisfactorily with trimethine cyananine dyes of the oxazoline and dihydrooxazine series if mercapto or selenol compounds which contain acid groups are present as hypersensitizing additives.

According to the invention, the photographic material contains in at least one silver halide emulsion layer a trimethine cyanine dye of the following formula:

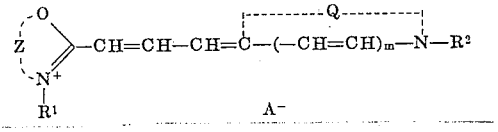

wherein $R^1$ and $R^2$ represent the same or different radicals, namely 1. saturated or unsaturated aliphatic hydrocarbon groups which preferably contain up to 6 carbon atoms and which may be substituted, e.g. with phenyl, hydroxy, halogen, amino, carboxyl, sulpho, sulphonylamino, sulphamyl, carbon-amide, carbamyl, carbalkoxy, sulphato or thiosulphato,
2. cycloalkyl such as cyclohexyl or
3. aryl, especially phenyl;

Z represents a radical required to complete an optionally substituted oxazoline or dihydrooxazine ring; Z preferably denotes the following radical:

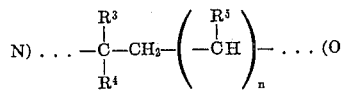

$R^3$, $R^4$ and $R^5$ represent the same or different radicals, namely 1. hydrogen,
2. saturated or olefinically unsaturated aliphatic hydrocarbon groups which preferably contain up to 6 carbon atoms and which may be substituted e.g. with phenyl, hydroxy or acetoxy,
3. cycloalkyl, for example, cyclohexyl, or
4. aryl, in particular phenyl, $m = 0$ or $1$, $n = 0$ or $1$, $A^-$ represents any anion, e.g. a halide such as chloride, bromide or iodide, perchlorate, sulphate, methyl sulphate or p-toluenesulphonate; the anion is absent in cases where $R^1$ and/or $R^2$ contains an acid group in the anionic form so that a betaine is present;

Q = a radical required to complete a hetercyclic group with a 5-membered or 6-membered heterocyclic ring; the heterocyclic group may contain a condensed benzene or naphthalene ring and additional substituents; the heterocyclic groups may be those commonly found in cyanine chemistry, for example those of the thiazole series (e.g. thiazole; 4-methylthiazole; 5-methylthiazole; 4,5-dimethylthiazole; 4-phenylthiazole; 5-phenylthiazole; 4,5-diphenylthiazole; benzothiazole; 4-chlorobenzothiazole; 5-chlorobenzothiazole; 6-chlorobenzothiazole; 7-chlorobenzothiazole; 6-bromobenzothiazole; 5-iodobenzothiazole; 6-iodobenzothiazole; 4-methylbenzothiazole; 5-methylbenzolthiazole; 6-methylbenzothiazole; 5,6-dimethylbenzothiazole, 4-phenylbenzothiazole; 5-phenylbenzothiazole; 6-phenylbenzothiazole; 5-hydroxybenzothiazole; 6-hydroxybenzothiazole; 4-methoxybenzothiazole; 5-methoxybenzothiazole; 6-methoxybenzothiazole; 5-ethoxybenzothiazole; 6-ethoxybenzothiazole; 5,6-dimethoxybenzothiazole; 5,6-methylene-dihydroxybenzothiazole; 5-diethylaminobenzothiazole; 6-diethylaminobenzothiazole; 5-carboxybenzothiazole; 5-sulphobenzothiazole; tetrahydrobenzothiazole; 7-oxotetrahydrobenzothiazole; naphtho[1,2-d]thiazole; naphtho[2,1-d]thiazole; 5-methoxy-naphtho[2,1-d]thiazole; 5-ethoxynaphtho[2,1-d]thiazole; 7-methoxynaphtho[2,1-d]thiazole; 8-methoxynaphtho[1,2-d] thiazole, etc.), those of the selenazole series (e.g. selenazole; 4-methylselenazole; 4-phenylselenazole; benzoselenazole; 5-chlorobenzoselenazole; 5,6-dimethylbenzoselenazole; 5-hydroxybenzoselenazole; 5-methoxybenzoselenazole; tetrahydrobenzoselenazole; naphtho[1,2-d]selenazole or naphtho[2,1-d]selenazole), those of the oxazole series (e.g. oxazole, 4-methyloxazole; 4-phenyloxazole; 4,5-diphenyloxazole; benzoxazole; 5-chlorobenzoxazole; 6-chlorobenzoxazole; 5,6-dimethylbenzoxazole; 5-phenylbenzoxazole; 5-hydroxybenzoxazole; 5-methoxybenzoxazole; 5-ethoxybenzoxazole; 6-dialkylaminobenzoxazole; 5-carboxybenzoxazole; 5-sulphobenzoxazole; 5-sulphonamidobenzoxazole; 5-β-carboxyvinylbenzoxazole; naphtho-[1,2-d]oxazole; naphtho[2,1-d]oxazole or naphtho[2,3-d] oxazole), those of the imidazole series (e.g. 1-methylimidazole; 1-ethyl-4-phenylimidazole; 1-butyl-4,5-dimethylimidazole; 1-methylbenzimidazole; 1-butyl-4-methylbenzimidazole; 1-ethyl-5,6-dichlorobenzimidazole; 1-ethyl-5-trifluoromethylbenzimidazole; 1-methylnaphtho[1,2-d]imidazole or 1-ethylnaphtho[2,3-d] imidazole), those of the 3,3-dialkylinodolenine series (e.g. 3,3-dimethylindolenine, 3,3,5-trimethylindolenine, 3,-3-dimethyl-5-methoxyindolenine, etc.) those of the 2-pyridine series (e.g. pyridine; 3-methylpyridine; 4-methylpyridine; 5-methylpyridine; 6-methylpyridine; 3,4-dimethylpyridine; 3,5-dimethylpyridine; 3,6-dimethylpyridine; 4,5-dimethylpyridine; 4,6-dimethylpyridine; 4-chloropyridine; 5-chloropyridine; 6-chloropyridine; 3-hydroxypyridine; 4-hydroxypyridine; 5-hydroxypyridine; 6-hydroxypyridine; 3-phenylpyridine; 4-phenylpyridine; 6-phenylpyridine, etc.), those of the 4-pyridine series (e.g. 2-methylpyridine; 3-methylpyridine; 2,3-dimethylpyridine; 2,5-dimethylpyridine; 2,6-dimethylpyridine; 2-chloropyridine; 3-chloropyridine; 2-hydroxypyridine; 3-hydroxypyridine; etc.), those of the 2-quinoline series (e.g. quinoline; 3-methylquinoline; 5-methylquinoline; 7-methylquinoline; 6-chloroquinoline; 8-chloroquinoline; 6-methoxyquinoline; 6-ethoxyquinoline; 6-hydroxyquinoline; 8-hydroxyquinoline; 5-oxo-5,6,7,8-tetrahydroquinoline, etc.), those of the 4-quinoline series (e.g. quinoline; 6-methoxyquinoline; 7-methylquinoline; 8-methylquinoline; etc.), those of the isoquinoline series (e.g. isoquinoline or 3,4-dihydroisoquinoline), those of the thiazoline series (e.g. thiazoline; 4-methylthiazoline, etc.) and those of the pyrroline, tetrahydropyridine, thiadiazole, oxadiazole, pyrimidine, triazine or benzothiazine series, the oxazoline or dihydrooxazine series.

The heterocyclic groups may carry any other additional substituents, e.g. additional alkyl or alkoxy groups preferably containing up to 3 carbon atoms such as methoxy or ethoxy, hydroxyalkyl, alkylthio, aryl such as phenyl, amino or substituted amino.

The following are examples of suitable compounds. The absorption maxima are determined in methanolic solution.

| No. | Dye | Absorption maximum (nm) |
|---|---|---|
| 1 | 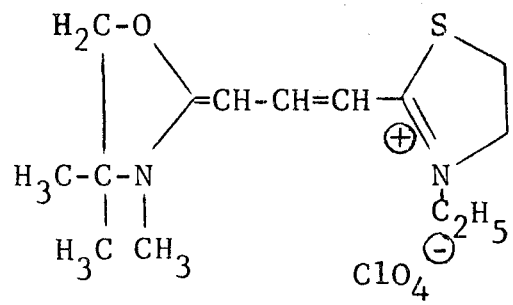 | 419 |
| 2 | 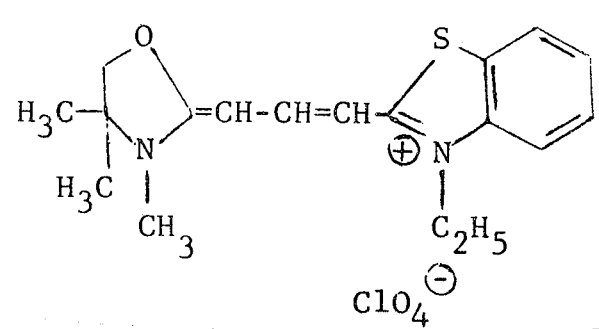 | 472 |
| 3 | 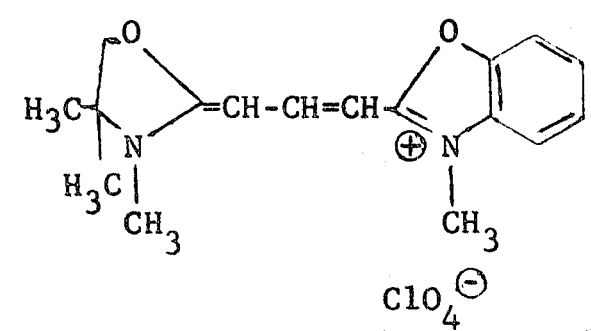 | 436 |

| Nr. | Dye | Absorption maximum (nm) |
|---|---|---|
| 4 | 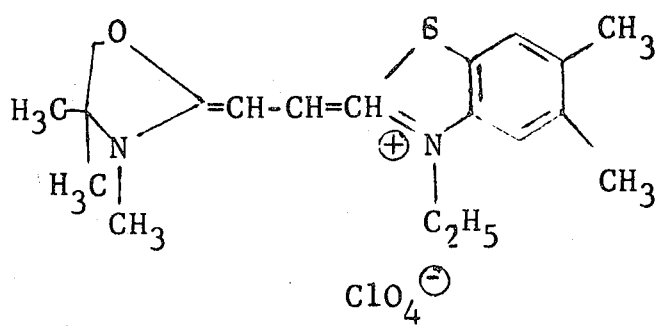 | 479 |
| 5 | 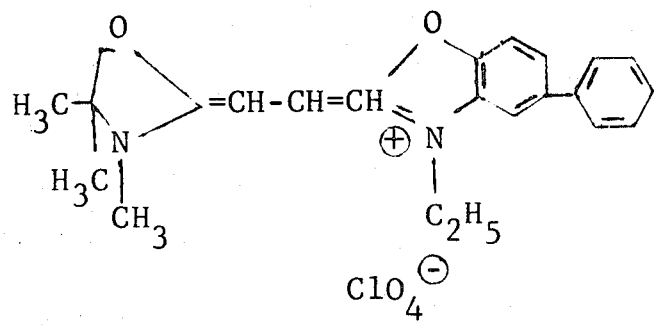 | 442 |
| 6 | 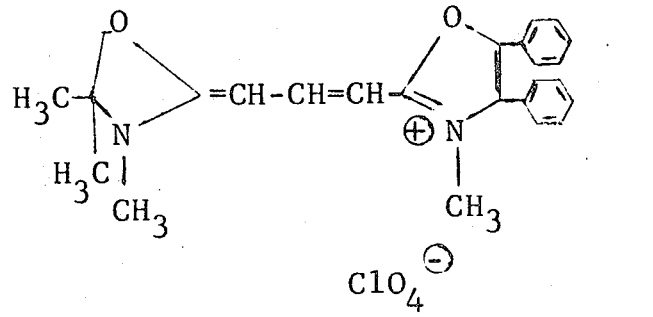 | 450 |
| 7 | 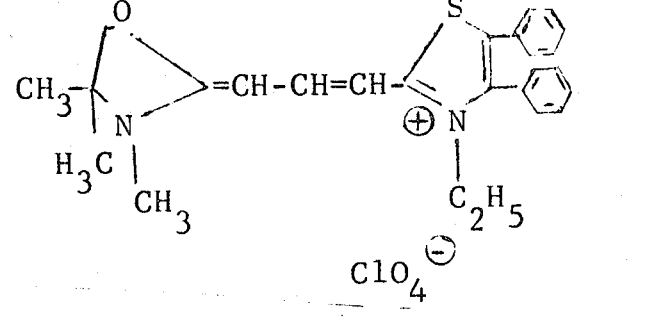 | 490 |
| 8 | 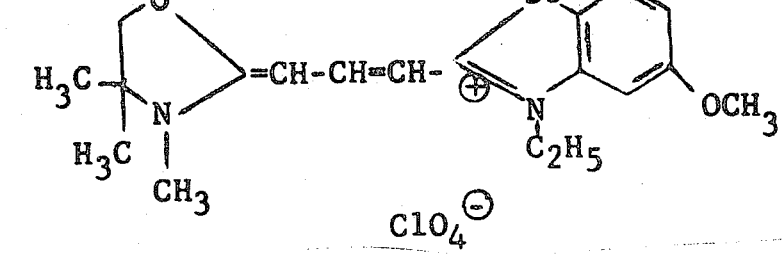 | 487 |

| Nr. | Dye | Absorption maximum (nm) |
|---|---|---|
| 9 | 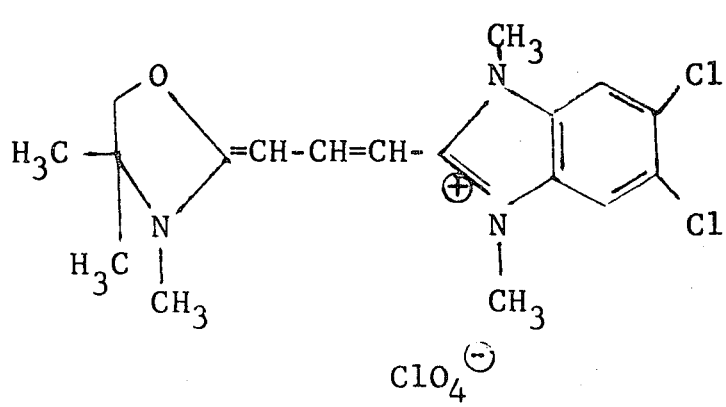 | 445 |
| 10 | 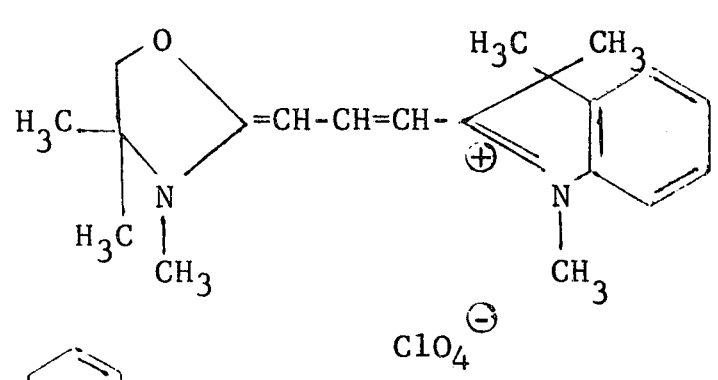 | 455 |
| 11 | 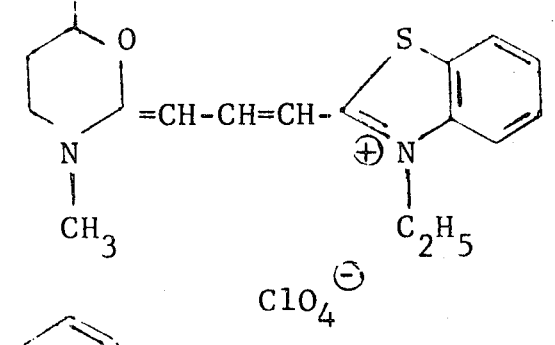 | 476 |
| 12 | 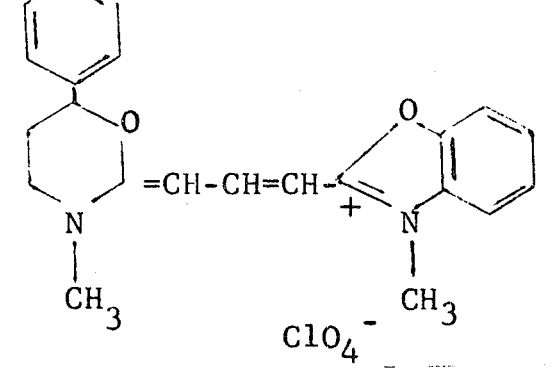 | 441 |

| Nr. | Dye | Absorption maximum (nm) |
|---|---|---|
| 13 | 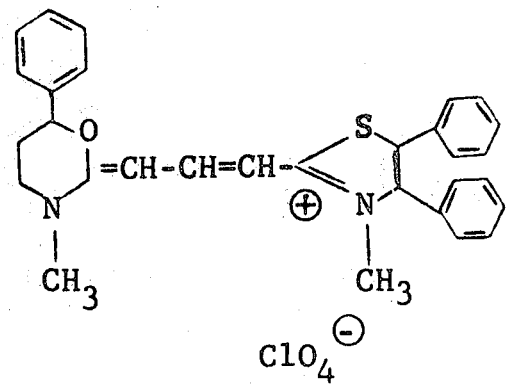 | 496 |
| 14 | 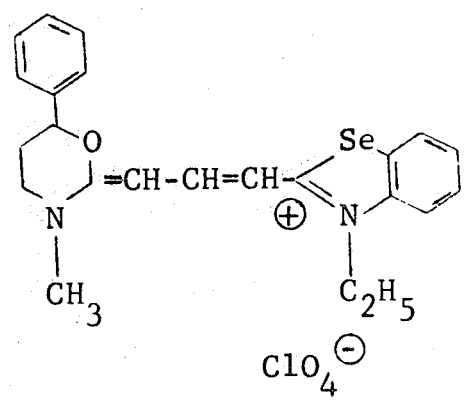 | 479 |
| 15 | 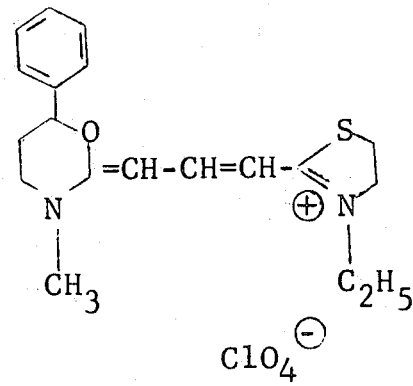 | 424 |
| 16 | 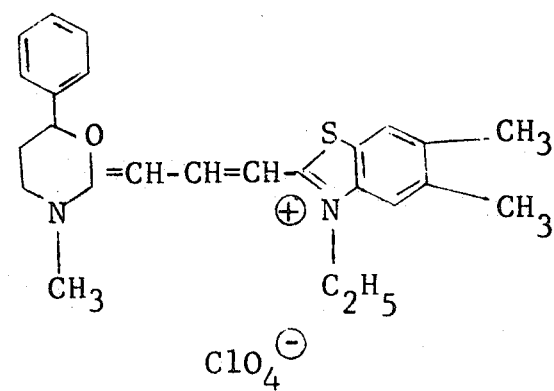 | 484 |

| Nr. | Dye | Absorption maximum (nm) |
|---|---|---|
| 17 | [structure: 4,4,6-trimethyl-3-methyl-tetrahydro-1,3-oxazine =CH-CH=CH- benzothiazolium N-C$_2$H$_5$; ClO$_4^-$] | 475 |
| 18 | [structure: 4,4,6-trimethyl-3-methyl-tetrahydro-1,3-oxazine =CH-CH=CH- benzoxazolium N-CH$_3$; ClO$_4^-$] | 439 |
| 19 | [structure: 4,4,6-trimethyl-3-methyl-tetrahydro-1,3-oxazine =CH-CH=CH- benzoselenazolium N-CH$_3$; ClO$_4^-$] | 478 |
| 20 | [structure: 6-phenyl-3-methyl-tetrahydro-1,3-oxazine =CH-CH=CH- 5-phenyl-benzoxazolium N-C$_2$H$_5$; ClO$_4^-$] | 445 |

| Nr. | Dye | Absorption maximum (nm) |
|---|---|---|
| 21 | 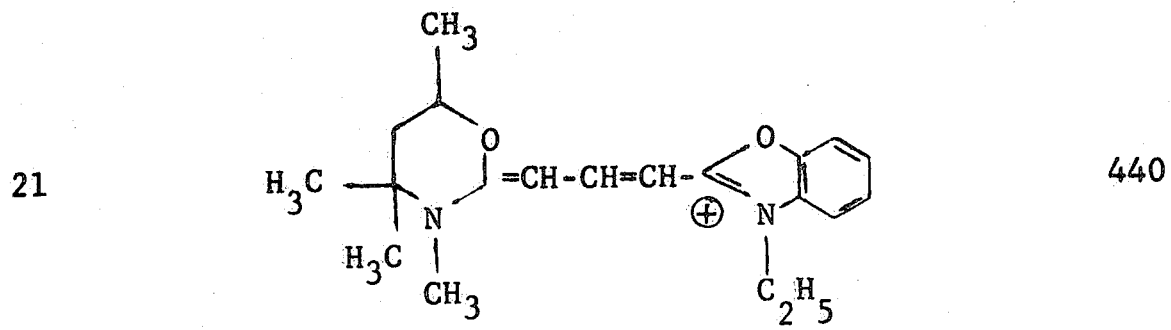 | 440 |
| 22 | 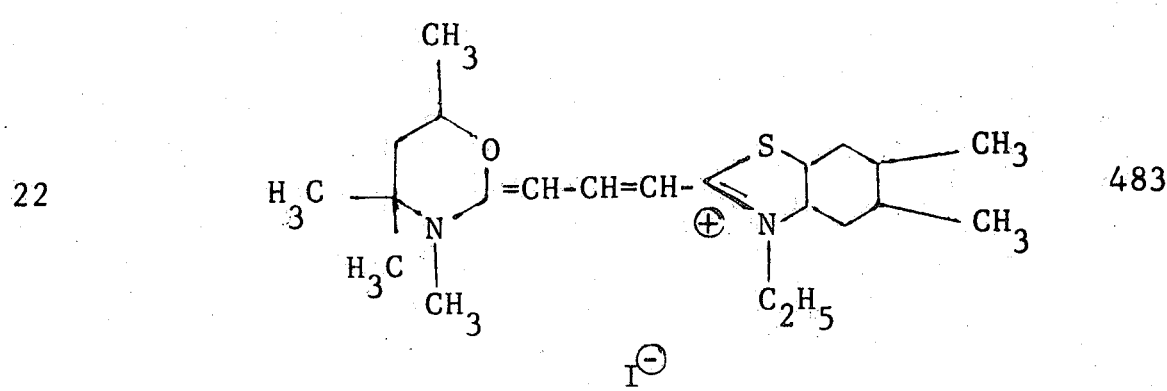 | 483 |
| 23 | 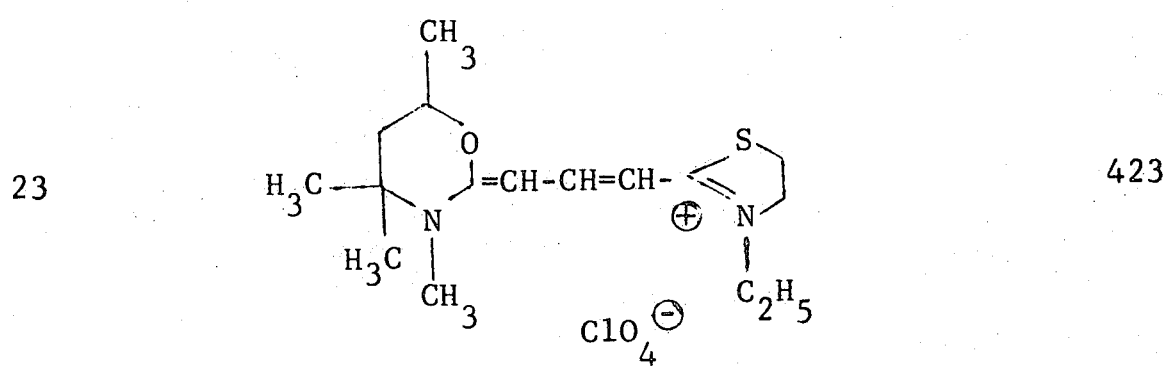 | 423 |
| 24 | 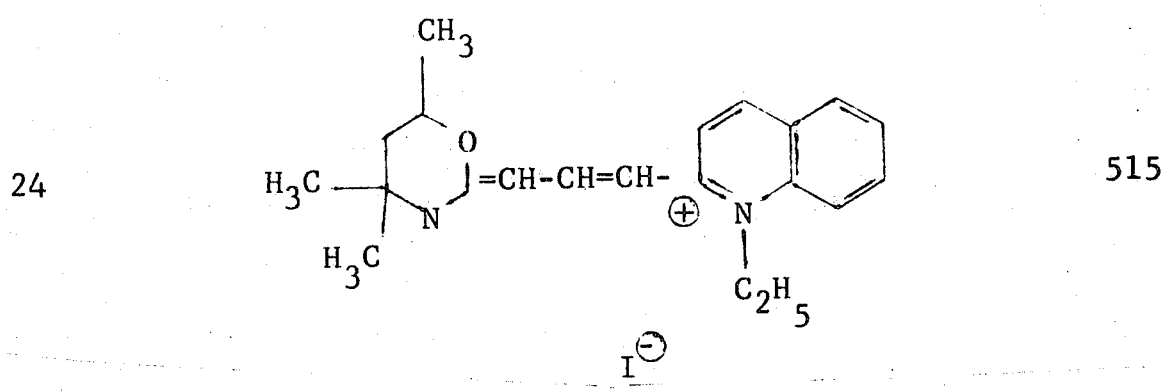 | 515 |

| Nr. | Dye | Absorption maximum (nm) |
|---|---|---|
| 25 | 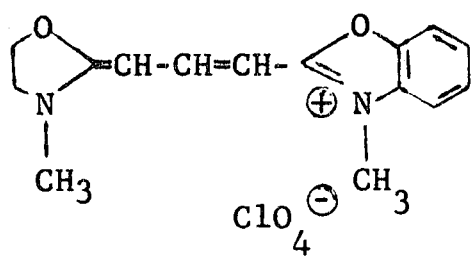 | 434 |
| 26 | 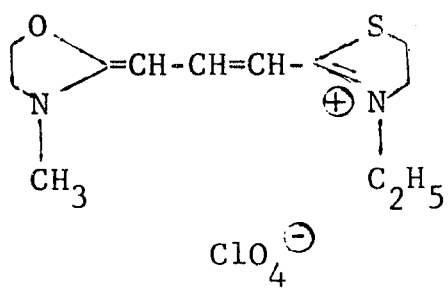 | 417 |
| 27 | 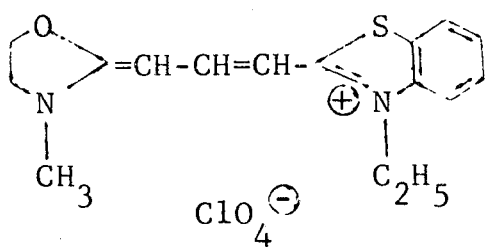 | 470 |
| 28 | 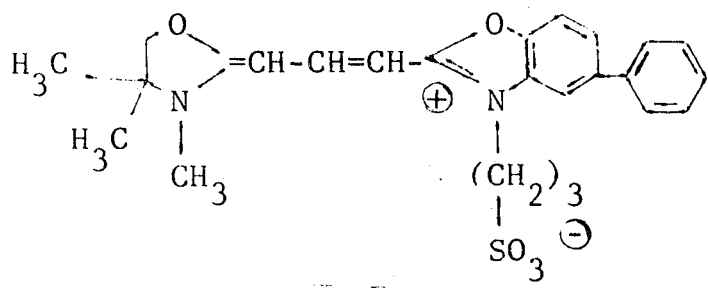 | 443 |

| Nr. | Dye | Absorption maximum (nm) |
|---|---|---|
| 29 | 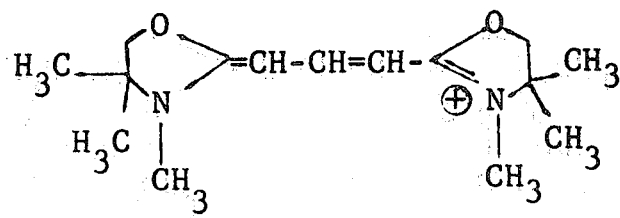 $ClO_4^{\ominus}$ | 392 |
| 30 | 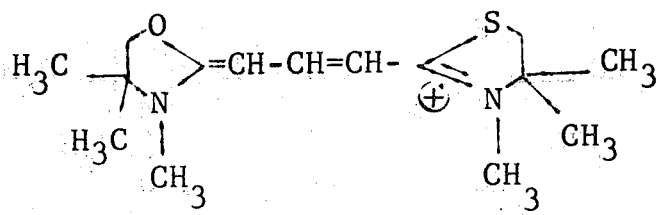 $ClO_4^{\ominus}$ | 419 |
| 31 | 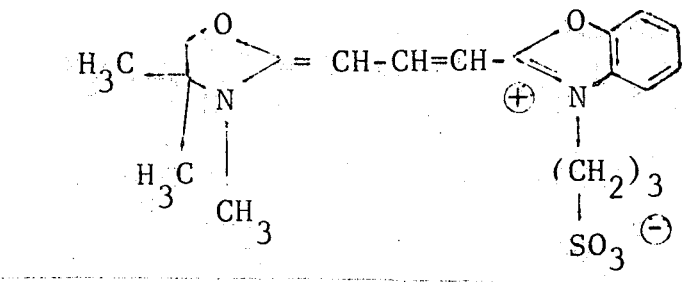 | 437 |
| 32 | 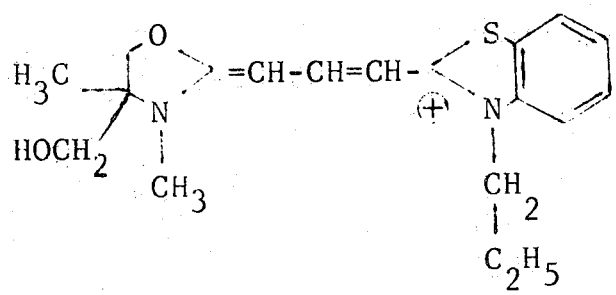 $ClO_4^{\ominus}$ | 478 |

| No. | Dye | Absorption maximum (nm) |
|---|---|---|
| 33 | 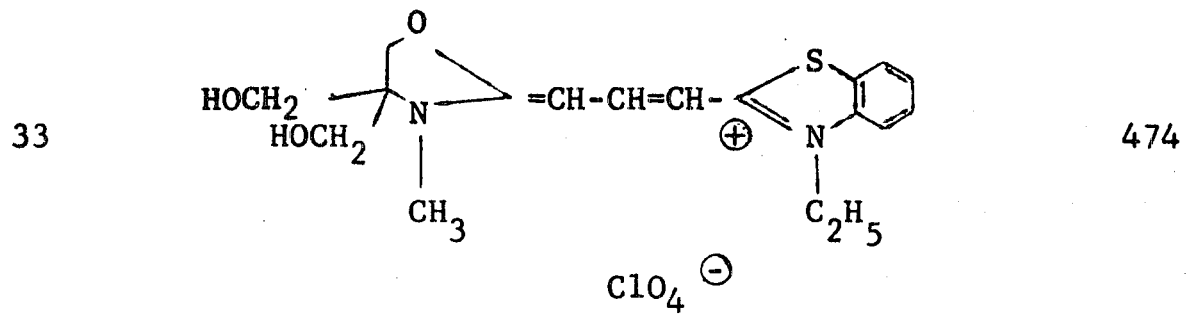 | 474 |
| 34 | 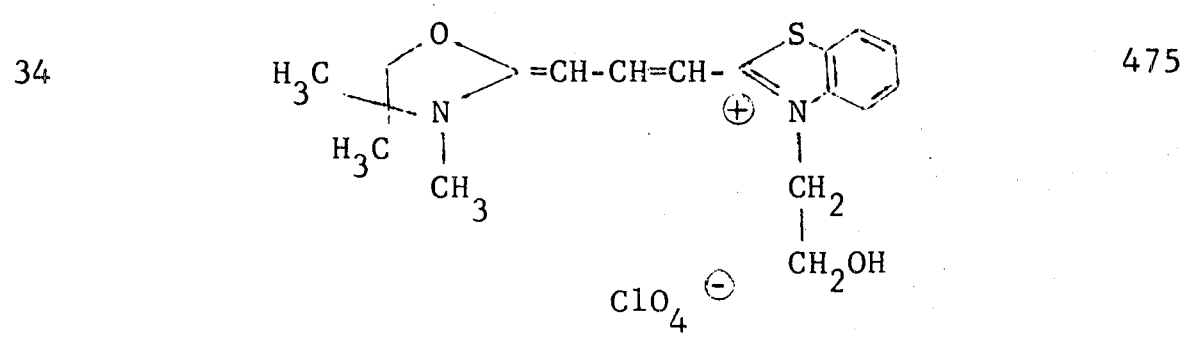 | 475 |
| 35 | 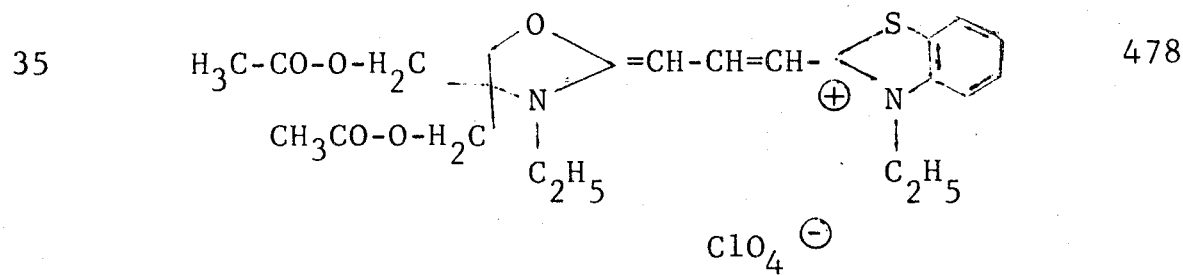 | 478 |
| 36 | 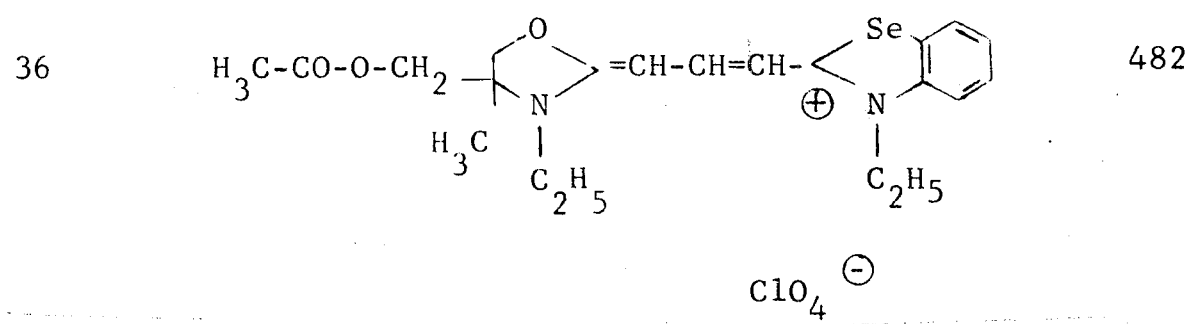 | 482 |

The cyanine dyes for use according to the invention are prepared by known methods. The preparation of dyes 3 and 4 is described in detail below.

DYE 3

1.2 ml of dimethylsulphate is slowly added to 1.5 g of 2,4,4-trimethyl-oxazoline, the temperature rising to 80° C. The resulting quaternary salt is left to stand at room temperature with 4.3 g of 1-methyl-2-acetanilidovinylbenzoxazole-p-toluenesulfonate in 10 ml of acetic anhydride and 2ml of triethylamine for 2 hours without any further purification. The dye is precipitated with sodium perchlorate solution, filtered through a suction filter and recrystallised twice from methanol with the addition of active charcoal. Yield: 1.4 g, m.p. 292°–293° C.

DYE 4

3.7 g of 3,4,4-trimethyl-2-anilidovinyl-oxazolinium iodide and 3,3 g of 2,5,6-trimethyl-3-ethyl-benzothiazolium iodide are dissolved in 10 ml of acetic anhydride with the addition of 2 ml of triethylamine. After leaving the reaction mixture to stand at room temperature for 1 hour, the dye is precipitated with ether, the precipitate being obtained in the form of an oil. The ethereal solution is decanted, the oil is taken up in methanol and the dye is precipitated with sodium perchlorate solution, filtered through a suction filter and recrystallised from methanol with the addition of active charcoal. Yield: 1.7 g, m.p. 235°–237° C.

The photographic material according to the invention also contains a mercapto or selenol compound of the following formula as hypersensitizing additive in the same silver halide emulsion layer which contains the above mentioned trimethine dyes:

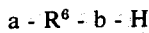

wherein
b represents S or Se;
$R^6$ represents a divalent saturated or unsaturated aliphatic radical having up to 18 carbon atoms, a divalent aryl radical, in particular phenylene, or a divalent heterocyclic radical which is derived e.g. from imidazole, triazole, oxazole, thiazole, selenazole, pyrimidine, triazine, tetrazole, pyridine, benzimidazole, benzoxazole, naphthoxazole, benzothiazole, benzoselenazole, quinoline, quinoxaline, quinazoline, furyl or thienyl; the above radicals may contain any other substituents in addition;
a = any acid group such as $SO_2H$, $SO_3H$, COOH, $PO_3H_2$, $AsO_3H_2$, CO-NHR, NH-COR, $SO_2$-NHR or NH-$SO_2$R, in which R may denote hydrogen or any aliphatic or aromatic radical.

The acid mercapto or selenol compounds may, of course, be used in the form of their salts, e.g. the sodium, potassium, magnesium or calcium salt or the salt with ammonia or organic bases.

The following hypersensitizing mercapto or selenol compounds have been found to be especially suitable:
I 2-Mercapto-5-chloro-7-sulpho-benzoxazole
II 2-Mercapto-5-($\beta$-carboxyvinyl)-7-methoxybenzoxazole
III 2-Mercapto-5-$\beta$-carboxyethyl-7-methoxybenzoxazole
IV 2-Mercapto-7-carboxybenzoxazole
V 2-Mercapto-8-sulpho-naphtho[1,2-d]oxazole
VI 2-Mercapto-4-(3'-sulphophenyl)-5-thio-1,3,4-thiadiazole
VII 2-Mercapto-5-sulphobenzothiazole
VIII 2-Mercapto-6-sulphobenzothiazole
IX 2-Mercapto-1-dodecyl-5-sulphobenzimidazole
X Thiophenol-4-sulphonic acid
XI 2-Mercapto-8-sulpho-naphtho[1,8-de]oxazine
XII Thiosalicyclic acid
XIII $\alpha$-Mercapto-stearic acid
XIV 2-Mercapto-5-(p-chlorophenylsulphonyl)-benzothiazole
XV Selenophenol-4-sulphonic acid
XVI 2-Mercapto-7-sulpho-naphtho[2,3-d]oxazole.

The above mercapto or selenol compounds are known compounds. Methods of preparation of these substances may be found in the relevant literature.

The combination of oxazoline- or dihydrooxazine-trimethine cyanine and hypersensitizing mercapto or selenol compound used according to the invention imparts high sensitivity to silver halide emulsions. The special advantage of this combination is that the layer is only slightly coloured by the dye and there is practically no tendency to give rise to fogging. This last mentioned property is particularly remarkable because hypersensitizing combinations of known sensitizing dyes often increase fogging and are for this reason practically unusable.

The trimethinecyanines and SH or SeH compounds according to the invention may be added in any sequence and to any silver halide emulsions. Suitable silver halides are especially silver chloride, silver bromide or mixtures thereof, optionally with a small silver iodide content of up to 10 mols %. The silver halides may be dispersed in the usual hydrophilic compounds, for example carboxymethylcellulose, polyvinyl alcohol, polyvinylpyrrolidone, alginic acid and its salts, esters or amides or gelatine, gelatine being preferred.

The trimethinecyanines and hpersensitizing compounds used according to this invention are preferably added to the photographic emulsion after chemical ripening and before casting. The methods used for this are generally known to the expert. The compounds are generally incorporated with the emulsion in the form of a solution in a solvent which must, of course, be compatible with gelatine and must not have any adverse effect on the photographic properties of the emulsion. The solvents generally used are water, alcohols such as methanol or ethanol, dimethyl formamide, pyrrolidones, phenols or mixtures thereof. The quantity of trimethinecyanine added may vary within wide limits, e.g. between 10 and 1,000 mg. preferably between 30 and 300 mg per mol of silver halide. The concentration of the dye may be adapted to the given requirements depending on the nature of the emulsion and the desired sensitization effect. The most suitable combination for any given emulsion can easily be determined by the usual tests carried out in photographic work.

The same applies to the hypersensitizing additives. The SH or SeH compounds may be added in quantities of 100 mg to 10,000 mg per mol of silver halide. Concentrations of 300 mg to 3,000 mg per mol of silver halide are preferred. These compounds are added to the emulsions in otherwise the usual manner using, if desired, the processes described above.

The emulsions may also contain chemical sensitizers, e.g. reducing agents such as tin-II salts, polyamines such as diethylenetriamine, or sulphur compounds such as those described in U.S. Pat. specification No. 1,574,944. The given emulsions may also contain salts or complex compounds of noble metals such as ruthenium, rhodium, palladium, iridium, platinum or gold for chemical sensitization, as described in the article by R. Koslowsky, Z.wiss.Phot. 46, 65-72 (1951).

The emulsions may also contain polyalkylene oxides as chemical sensitizers, especially polyethylene oxide and derivatives thereof.

The emulsions according to the invention may also contain the usual stabilizers, e.g. homopolar or salt-type compounds of mercury having aromatic or heterocyclic rings, such as mercaptotriazoles, simple mercury salts, sulphonium mercury double salts and organic mercury compounds. Azaindenes are also suitable for use as stabilizers, especially tetra- or penta-azaindenes, and particularly those substituted with hydroxyl or amino groups. Compounds of this type have been described in the article by Birr, Z.wiss.Phot. 47, 2-58 (1952). Other suitable stabilizers are e.g. other heterocyclic mercapto compounds such as phenylmercaptotetrazole, quaternary benzothiazole derivatives, benzotriazole and the like.

The emulsions may be hardened in the usual manner, for example with formaldehyde or halosubstituted aldehydes which contain a carboxy group, such as mucobromic acid, diketones, methanesulphonic acid esters, dialdehydes and the like.

The emulsions according to the invention may be used for various photographic processes, for example in materials used for producing original copies, for copying materials, for reprotechnical films, for X-ray films, for materials which are suitable for the silver salt diffusion process and for colour photographic materials, for example those used in the chromogenic development process, the silver dye bleaching process for the dye diffusion process. The following examples illustrate the present invention and are not to be regarded as limitative. All parts and proportions referred to herein and in the appended claims are by weight unless otherwise indicated.

EXAMPLE 1

20 mg of dye in the form of a 3% methanolic solution are added in each case to 1 kg of a silver chloride gelatine emulsion. The emulsion is cast on a baryta paper support in the usual manner and dried. The light sensitive layer is exposed behind a grey step wedge (3 $\sqrt{2}$ wedge) and developed for 1½ minutes in a developer of the following composition:
  1 g of p-methylaminophenol
  3 g of hydroquinone
  13 g of anhydrous sodium sulphite
  26 g of anhydrous $Na_2CO_3$
  1 g of potassium bromide
  made up of 1,000 ml with water.

After the usual fixing, the steps obtained are counted. In a second sample of emulsion, 120 mg of mercapto compound V are added in addition to the dye. Samples are then treated in the same way as described above. The results are summerised in the table below.

TABLE 1

| Dye No. | Sensitization maximum (nm) without Compound V | Sensitization maximum (nm) with Compound V | Steps 3 $\sqrt{2}$ without Compound V | Steps 3 $\sqrt{2}$ with Compound V |
|---|---|---|---|---|
| 1 | 469 | 449 | 9 | 13 |
| 2 | 500 | 505 | 14 | 23 |
| 3 | 466 | 468 | 7 | 16 |
| 5 | 470 | 470 | 10 | 17 |
| 6 | 473 | 476 | 11 | 17 |
| 9 | 465 | 475 | 12 | 17 |
| 10 | 485 | 487 | 7 | 20 |
| 11 | 509 | 510 | 19 | 24 |
| 15 | 460 | 450 | 11 | 15 |
| 16 | 507 | 507 | 21 | 22 |
| 20 | 477 | 478 | 17 | 19 |
| 22 | 512 | 515 | 21 | 24 |
| 23 | 465 | 450 | 11 | 14 |
| 25 | 467 | 469 | 10 | 18 |
| 26 | 465 | 445 | 10 | 14 |
| 27 | 501 | 504 | 16 | 22 |
| 30 | 455 | 450 | 8 | 15 |

Table 1 clearly shows the increase in sensitivity resulting from the addition of mercapto compound V. Table 1 also shows that in the presence of an oxazoline or dihydro-oxazine-thiazoline-trimethinecyanine (Dyes 1, 15, 23, 26 and 30) the sensitization maximum is shifted towards shorter wavelengths by up to 20 nm by the addition of Compound V.

EXAMPLE 2:

The procedure is the same as in Example 1 except that a silver chlorobromide gelatine emulsion is used instead of a silver chloride gelatine emulsion.

TABLE 2

| Dye No. | Sensitization maximum (nm) without Compound V | Sensitization maximum (nm) with Compound V | Steps 3 $\sqrt{2}$ without Compound V | Steps 3 $\sqrt{2}$ with Compound V |
|---|---|---|---|---|
| 2 | 503 | 503 | 14 | 17 |
| 17 | 505 | 507 | 16 | 17 |
| 19 | 512 | 512 | 17 | 18 |

EXAMPLE 3

The experiments in Example 1 are repeated with the addition in each case of 120 mg of different mercapto compounds. Table 3 also shows the step numbers obtained if the material has been stored in a tropical cupboard (4 days, 40° C, 82% relative humidity) before being processed. Comparison with the samples not containing mercapto compounds clearly shows the improvement in the stability in storage in a tropical cupboard.

TABLE 3

| Dye Quantity | No. | Additive | Sensitization max. (nm) | Step 3 $\sqrt{2}$ fresh | Step 3 $\sqrt{2}$ after storage under tropical conditions |
|---|---|---|---|---|---|
| 30 mg | 1 | — | 469 | 11 | 8 |
| " | 1 | I | 448 | 17 | 17 |
| " | 1 | II | 447 | 15 | 16 |
| " | 1 | V | 450 | 17 | 18 |
| " | 1 | VII | 445 | 14 | 15 |
| " | 1 | IX | 445 | 14 | 13 |
| " | 1 | XIV | 443 | 14 | 15 |
| " | 1 | XVI | 445 | 15 | 15 |
| 20 mg | 22 | — | 512 | 21 | 19 |
| " | 22 | X | 511 | 24 | 24 |
| " | 22 | XI | 510 | 24 | 24 |
| " | 22 | XIV | 511 | 23 | 23 |

EXAMPLE 4

Example 1 is repeated with the addition of various quantities of mercapto compound V. The results are shown in Table 4.

TABLE 4

| Dye Quantity | No. | Additive | Sensitization max. (nm) | Step 3 | 2 |
|---|---|---|---|---|---|
| 20 mg | 23 | — | 465 | 11 | |
| " | 23 | 30 mg V | 452 | 14 | |
| " | 23 | 100 mg V | 450 | 16 | |
| " | 23 | 300 mg V | 450 | 15 | |

This invention has been disclosed with respect to certain preferred embodiments, and it will be understood that modifications and variations thereof will become obvious to persons skilled in the art and are intended to be included within the spirit and purview of this application and the scope of the appended claims.

What we claim is:

1. A light sensitive photographic material which comprises at least one silver halide emulsion layer which is sensitized with a combination of A. at least one dye of the formula:

$$Z \begin{pmatrix} O \\ \diagdown \\ \diagup \\ N \\ | \\ R^1 \end{pmatrix} C-CH=CH-CH=C-(-CH=CH)_m-N-R^2 \quad A^-$$

in which $m$ is 0 or 1

$R^1$ and $R^2$ which may be the same or different are saturated or unsaturated unsubstituted aliphatic hydrocarbon groups containing up to 6 carbon atoms or such group substituted by phenyl, hydroxy, halogen, amino, carboxyl, sulpho, sulphonyl-amino, sulphamyl, carbon amide, carbamyl, carbalkoxy, sulphato or thiosulphato; cycloalkyl groups; or aryl groups;

Z is a radical required to complete an oxazoline or dihydro-oxazine ring;

Q is a radical required to complete a heterocyclic group containing a 5 or 6 membered heterocyclic ring;

A is an anion which is absent if $R^1$ and/or $R^2$ contains an acid group in anionic form which provides a betaine structure, and, B. at least one mercapto or selenol compound of the formula $$a - R^6 - b - H$$

in which
   b is a sulphur or selenium atom,
   a is an acid group,
   $R^6$ is a divalent saturated or unsaturated aliphatic group containing up to 18 carbon atoms, or a divalent aryl or heterocyclic radical.

2. A material as claimed in claim 1 in which the group Z represents a group of the formula $$\begin{matrix} R^3 \\ | \\ -C-CH_2- \\ | \\ R^4 \end{matrix} \begin{pmatrix} R^5 \\ | \\ -CH- \end{pmatrix}_n$$

in which
   n = 0 or 1,
   $R^3$, $R^4$ and $R^5$, which may be the same or different are hydrogen atoms; saturated or unsaturated unsubstituted aliphatic hydrocarbon groups containing up to 6 carbon atoms or such group substituted by phenyl, hydroxy or acetoxy; cycloalkyl or aryl groups.

3. A material as claimed in claim 1 in which the dye (A) is present in the amount of 10 to 1,000 mg per mol of silver halide.

4. A material as claimed in claim 1 in which the dye (A) is present in an amount of 30 to 300 mg per mol of silver halide.

5. A material as claimed in claim 1 in which the mercapto or selenol compound is present in an amount of 100 to 10,000 mg per mol of silver halide.

6. A material as claimed in claim 1 in which the said compound is present in an amount of 300 to 3,000 mg per mol of silver halide.

* * * * *